(12) United States Patent
Shiiyama

(10) Patent No.: US 6,310,971 B1
(45) Date of Patent: *Oct. 30, 2001

(54) INFORMATION PROCESSING METHOD AND APPARATUS, AND STORAGE MEDIUM STORING MEDIUM STORING PROGRAM FOR PRACTICING THIS METHOD

(75) Inventor: Hirotaka Shiiyama, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/671,681

(22) Filed: Jun. 28, 1996

(30) Foreign Application Priority Data

Jul. 3, 1995 (JP) .................................................. 7-167378

(51) Int. Cl.⁷ .......................................................... G06K 9/00
(52) U.S. Cl. ............................................. 382/181; 382/305
(58) Field of Search .................................... 382/229, 231, 382/187, 189, 181, 177, 305

(56) References Cited

U.S. PATENT DOCUMENTS

| | | | |
|---|---|---|---|
| 3,213,420 | * 10/1965 | Eckert, Jr. .............................. | 382/229 |
| 4,556,951 | * 12/1985 | Dickman et al. ..................... | 382/229 |
| 5,150,424 | * 9/1992 | Aguro et al. .......................... | 382/189 |
| 5,319,721 | * 6/1994 | Chefalas et al. ...................... | 382/187 |
| 5,329,598 | * 7/1994 | Geist ...................................... | 382/229 |
| 5,410,612 | * 4/1995 | Arai et al. ............................. | 382/187 |
| 5,481,277 | * 1/1996 | Morinaga ............................. | 382/187 |
| 5,557,789 | * 9/1996 | Mase et al. ........................... | 382/187 |

OTHER PUBLICATIONS

Sedgewick, R., "Algorithms in C", Addison–Wesley Publishing Company, pp. 277–303, 1990.

* cited by examiner

Primary Examiner—Yon J. Couso
(74) Attorney, Agent, or Firm—Fitzpatrick, Cella, Harper & Scinto

(57) ABSTRACT

When a result obtained upon character recognition of an input image is to be used as text data for a search operation, a proper search operation can be performed even if a character different from the actual character image is stored as text data due to a character extraction error in character recognition processing. An information processing apparatus includes an image scanner for inputting image information, OCR software for recognizing the input image, a text information storage section for storing a recognition result, and document search software for assuming addition of an extra character in a designated search word, forming a pattern obtained by deleting a character from the search word, and searching a document using this pattern.

38 Claims, 12 Drawing Sheets

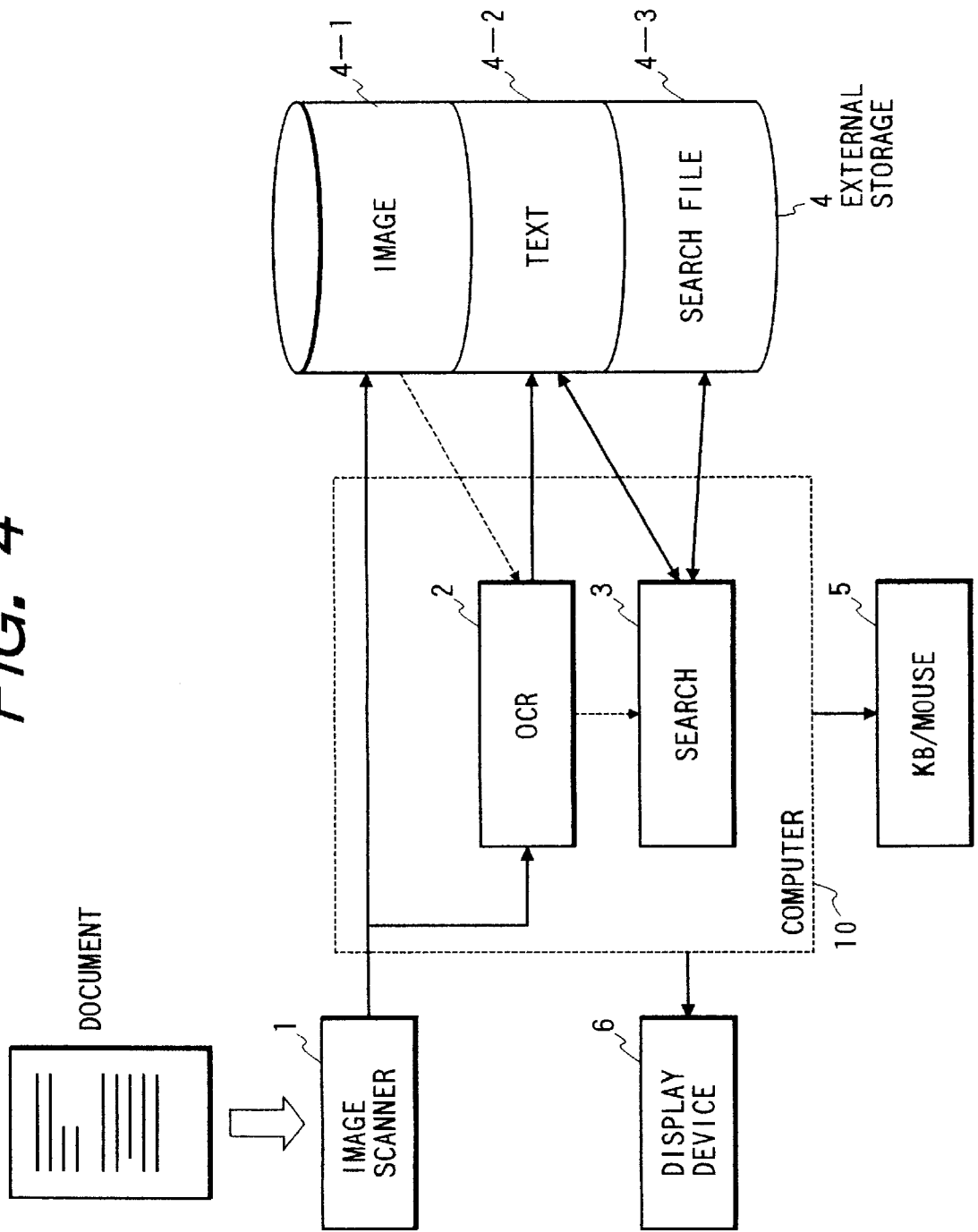

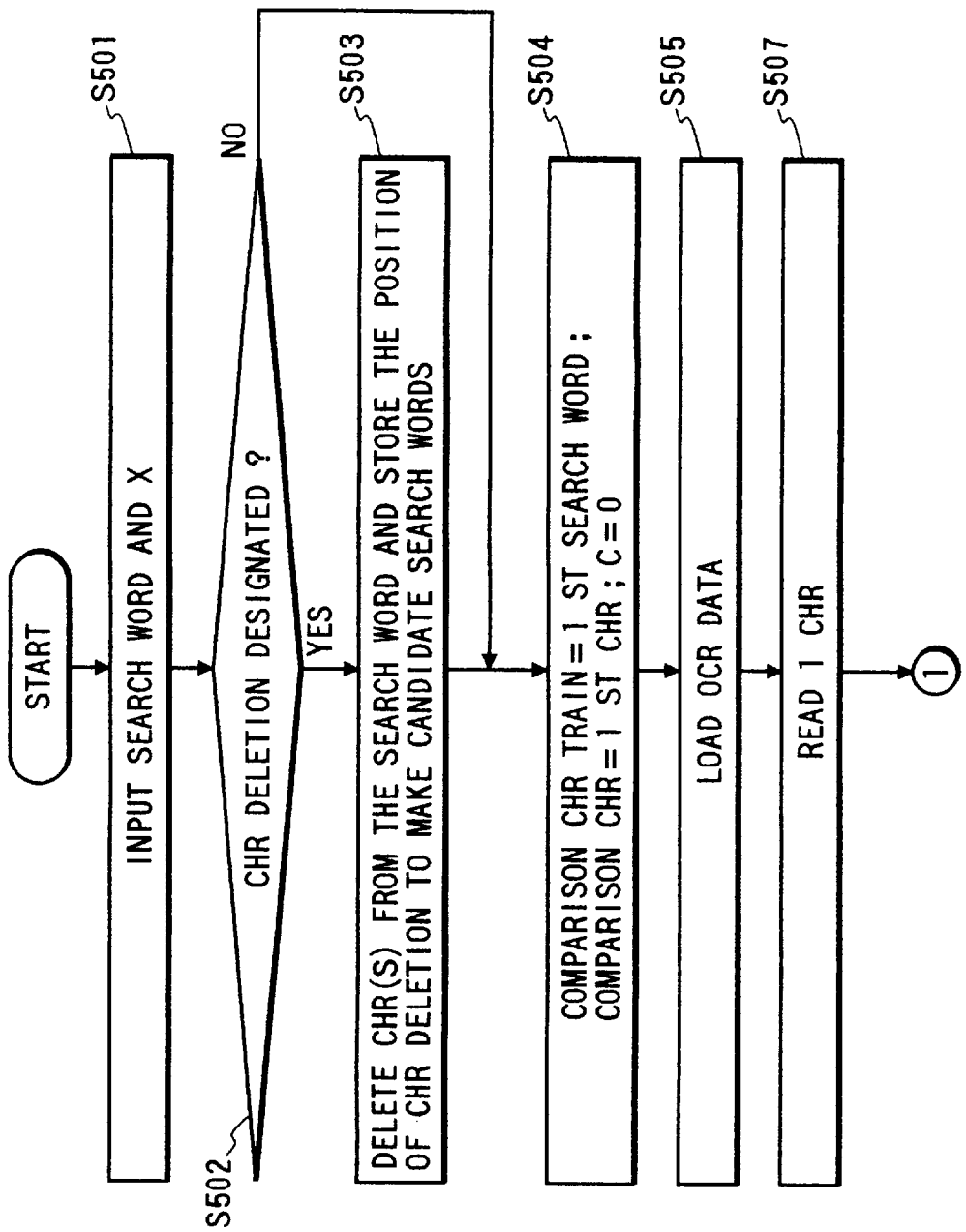

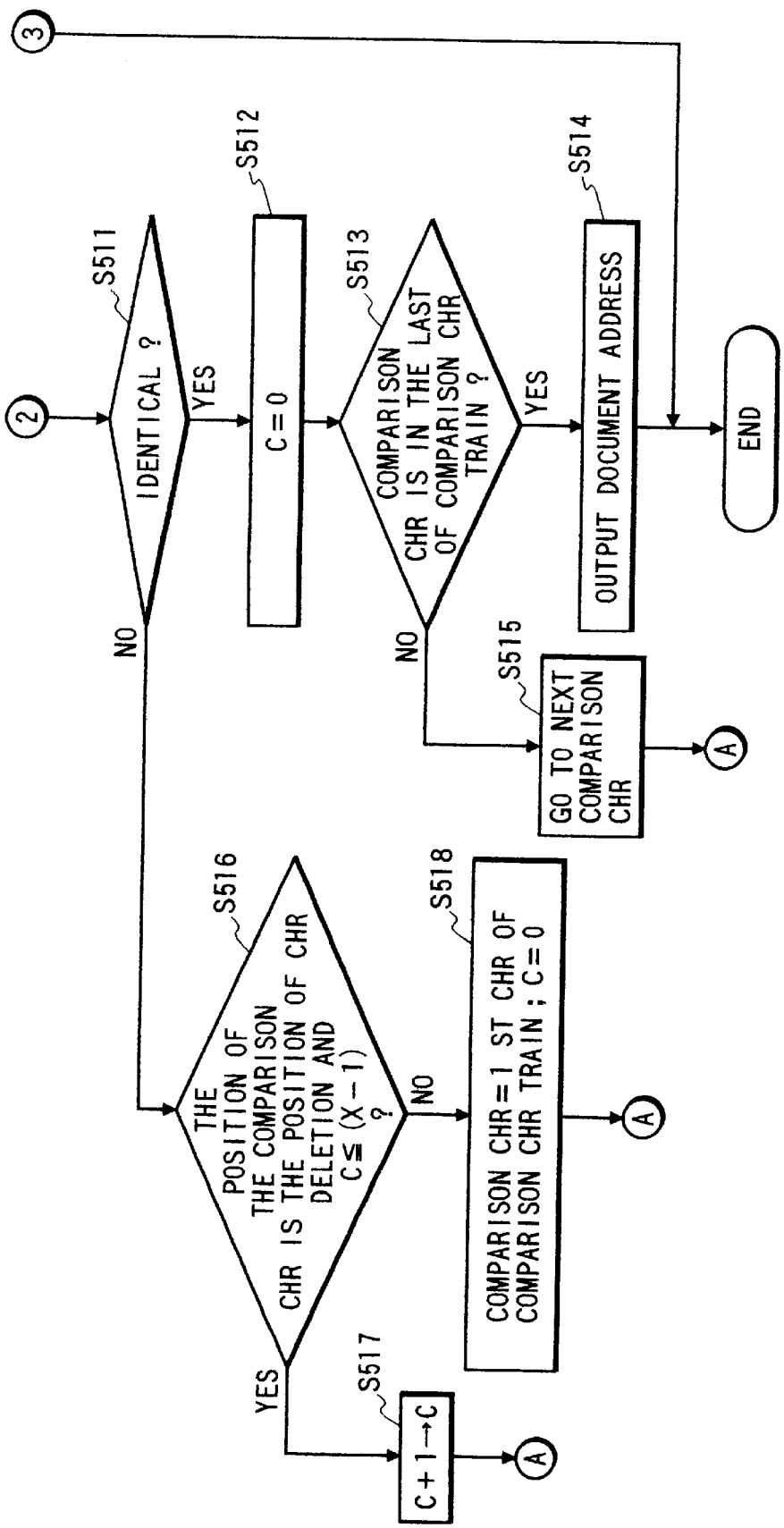

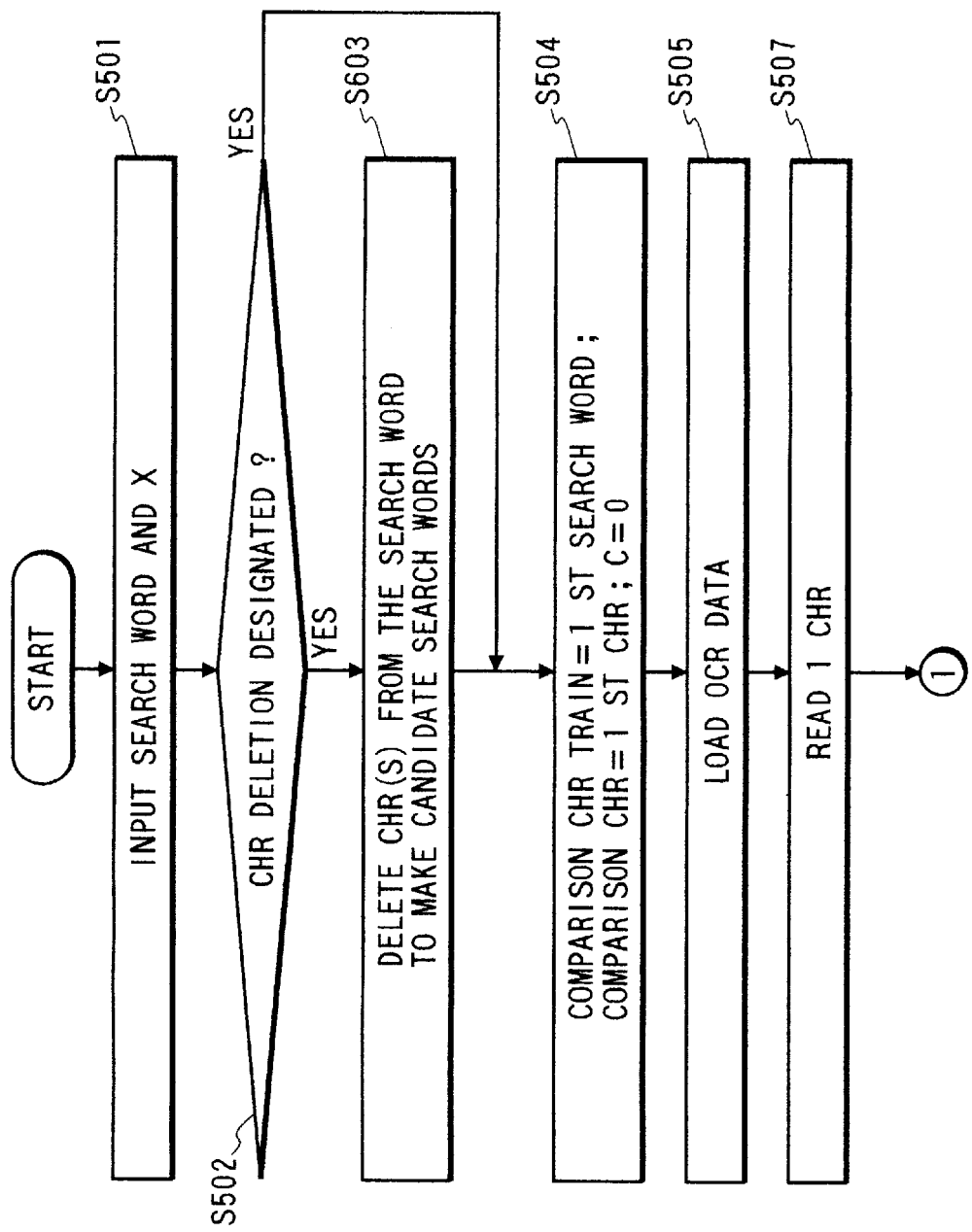

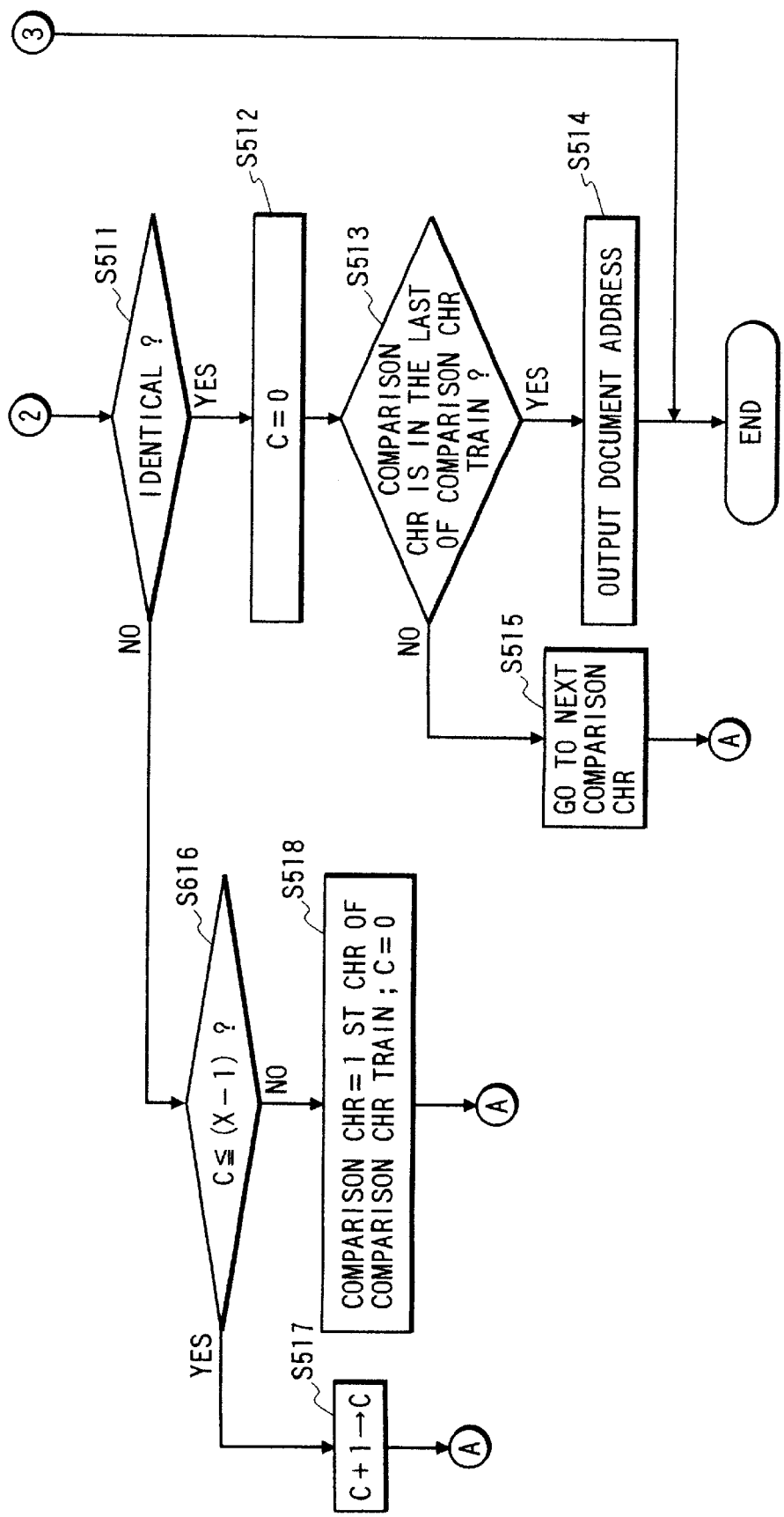

INFORMATION PROCESSING METHOD AND APPARATUS, AND STORAGE MEDIUM STORING MEDIUM STORING PROGRAM FOR PRACTICING THIS METHOD

BACKGROUND OF THE INVENTION

1. Field of the Invention

The present invention relates to an information processing method and apparatus capable of searching image or text information including a designated search word.

2. Related Background Art

An apparatus capable of searching an image and creating a database using an input image recognized by an optical character reader (OCR) or the like is conventionally available.

In this apparatus for searching the image and creating the database, the step of causing a user to confirm a recognition result is conventionally prepared prior to registration in order to overcome search incompleteness caused by erroneous recognition in recognition processing using an OCR. In this confirmation step, candidate characters including characters up to the ones having lower similarities in the recognition results are presented to the user. The user selects a correct character, or inputs a correct character if no correct character is included in the candidate characters. A text to be registered by the user is thus manually corrected by the user, and the corrected text is then registered.

A technique for mechanically correcting a text using a word dictionary or knowledge database is available in place of causing the user to manually perform this correction operation.

In the prior art requiring the manual correction operation of the user, the user's load is heavy, and a cumbersome operation for a long period of time is required in each registration operation. This correction operation interferes with full-automatic correction.

In the technique for mechanically correcting the text using the word dictionary or knowledge database, practical applications for full-automatic correction cannot be realized without using a computer having a large computation capacity. In addition, reliability on automatic correction is still problematic.

When erroneous correction is made in the correction step of limiting a recognition result corresponding to one input character image to one character, the corrected character cannot be restored to the input character image.

SUMMARY OF THE INVENTION

It is an object of the present invention to provide an information processing method including the step of determining whether a designated character train is included in text information, comprising the steps of forming a pattern in which at least one character is deleted from the designated character train, and performing the determining step using the formed pattern.

BRIEF DESCRIPTION OF THE DRAWINGS

FIG. 4 is a block diagram showing the arrangement of an information processing apparatus according to an embodiment;

DESCRIPTION OF THE PREFERRED EMBODIMENTS

Figure 1:
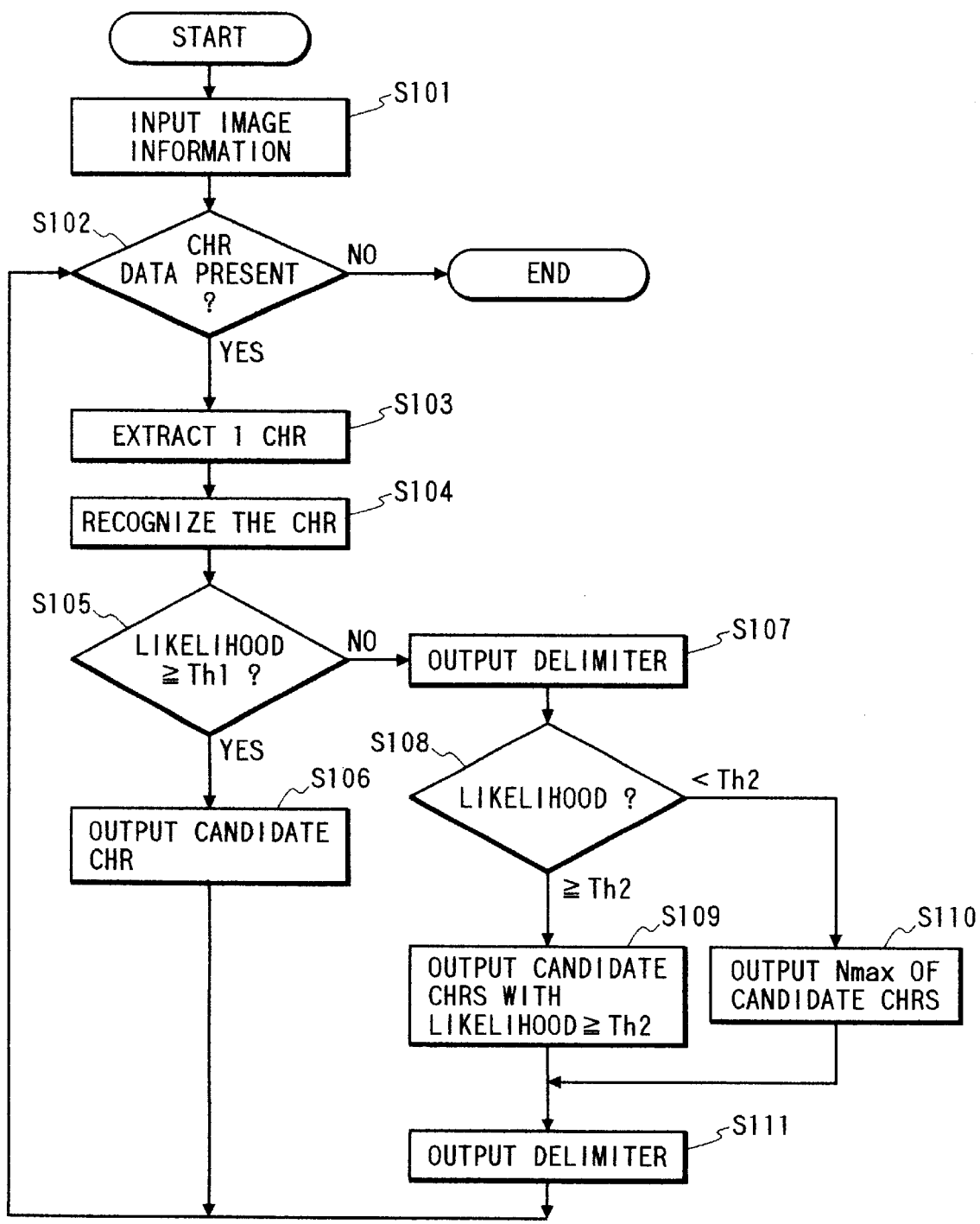
FIG. 1 is a flow chart showing OCR processing.

The arrangement of an information processing apparatus for practicing the present invention is shown in FIG. 4 and will be described below.

Referring to FIG. 4, an image scanner 1 is connected to a computer 10 directly or through a communication means. The image scanner 1 scans a document (original) image and optically reads the image. OCR (Optical Character Reader) processing software 2 is installed in the computer 10 to recognize the characters of image information input from the image scanner 1 or the like to obtain text information. Document search software 3 is installed in the computer 10 to form a search file from the text information obtained in OCR processing for processing the image information input from the image scanner 1 or the like. The document search software 3 also performs search processing.

The OCR processing software 2 and the document search software 3 are executed under the control of the CPU of the computer 10 in accordance with a control program stored in the memory of the computer 10. Processing operations represented by flow charts (to be described later) are also executed under the control of the CPU of the computer 10 in accordance with the control program stored in the memory of the computer 10.

An external storage 4 has an image information storage section 4-1 for storing image information input from the image scanner 1 or the like, a text information storage section 4-2, and a search file storage section 4-3. The search file storage section 4-3 stores indices, document management information (DB) and the like. A keyboard 5 inputs a search word and a search condition. A display device 6 displays prompts for a search word and a search condition, and also displays image information and the like. As described above, the computer 10 comprises the memory storing the control program for performing various processing operations to be described in this embodiment, the CPU for executing processing in accordance with the control program, and the like.

Accumulation processing in the image processing apparatus shown in FIG. 4 includes the steps of storing image information input from the image scanner 1 in the external storage 4, converting the image information stored in the external storage 4 into text information using the OCR processing software 2 and storing the text information in the external storage 4, and storing a search file formed from the text information by the document search software 3 in the external storage 4.

Search processing includes the steps of comparing a search word input from the keyboard 5 with a search file by the document search software 3 to search for a document matching a search condition, extracting document address information from this document, and displaying image data of this document on the display device 6.

In the search system realized by the accumulation processing and the search processing described above, a main method of preventing search omissions caused by erroneous recognition in OCR recognition will be described below.

There are mainly three methods of preventing search omissions.

1. Assuming that a character image is successfully extracted, a plurality of candidate characters and search indices using the recognition likelihoods of the plurality of candidate characters are formed, and a search is performed using the plurality of candidate characters and the search indices.
2. To consider whether an error is included in the extracted character image or whether a correct solution is not included in a plurality of candidate characters corresponding to one character input image, a search which allows the addition of an extra character to a designated search word is performed in comparison between the designated search word and a search file.
3. To consider whether an error is included in the extracted character image or whether a correct solution is not included in a plurality of candidate characters corresponding to one character input image, a character train pattern group is obtained by deleting a character or characters from a designated search word, and a search which allows the addition of an extra character to the character train pattern group is performed.

Method 1 will be described in detail with reference to a flow chart in FIG. 2, and methods 2 and 3 will be described in detail with reference to flow charts in FIGS. 3 and 5 to 7. Prior to a description of these flow charts, OCR processing executed in registering an image will be described with reference to a flow chart in FIG. 1.

(OCR Processing)

Image information to be registered is input from the image scanner 1 (S101). The input image information is stored in the image information storage section 4-1 of the external storage 4. Although the image information is directly input from the image scanner 1, it may be input from another computer or a FAX system through a communication means.

The input image information is analyzed to determine whether character data is present (S102). If NO in step S102, the flow does not advance to OCR processing, but normal image information registration processing is performed.

If YES in step S102, one-character image data is extracted (S103), and this extracted character is recognized (S104). Processing for deciding the form of character information stored as text information in steps S105 to S111 on the basis of this recognition result (including recognition likelihood information) is executed.

The processing for deciding the form of character information stored as the text information is executed as follows. When a recognition candidate character has a recognition likelihood determined (S105) to reach a predetermined significant likelihood determination threshold Th1, its candidate character is output as a recognition result (S106). However, when a recognition target character has a recognition likelihood determined (S105) not to reach the significant likelihood determination threshold Th1, a delimiter representing the start position of a plurality of candidate characters to identify the plurality of candidate characters is output (S107). The flow branches into case a (S809) and case b (S110) by adaptively considering (S108) the recognition likelihood of each of the plurality of recognition candidate characters.

a. Candidate characters each having a predetermined low recognition likelihood determination threshold Th2 (Th1>Th2) or more, and the number of these candidate characters are output.

b. Recognition candidate characters in number Nmax predetermined from the one having the highest likelihood, and the number of these recognition candidate characters are output.

The form of a result output in steps S107 to S111 is defined as "@ [number of candidate characters] [candidate character 1] [candidate character 2] [candidate character 3] . . . @".

In determination for branching in step S108, when all the recognition likelihoods of the plurality of recognition candidate characters are Th2 or less and almost identical to each other, the flow advances to step S110; otherwise, the flow advances to step S109.

The parameter Th1 used in these processing operations is a threshold for determining whether a recognition result is most likely and whether the candidate characters are limited to one character. The parameter Th2 is a threshold for determining whether a candidate character having a recognition likelihood value smaller than Th2 has an unlikely recognition result. The parameters Th1 and Th2 and the maximum number Nmax of recognition candidate characters are stored in the memory of the computer 10 in advance.

When the candidate characters are output in step S109 or S110, a delimiter representing the end position of the plurality of candidate characters is output (S111).

When the recognition result of one character is completely output, the flow returns to step S102, and recognition processing for the next character is performed. Processing in steps S102 to S111 is repeated until the absence of a character to be recognized is determined in step S102.

OCR processing shown in FIG. 1 will be described in detail in a case wherein a word of "parent" is present on an original.

A character image of "p" is extracted in step S103. Assume that a first candidate character "p" is obtained to have a value of the recognition likelihood Th1 or more as a result of recognition in step S104. In this case, a recognition result of "p" is output in step S106.

In the same manner as described above, "a" is output.

A character image of "r" is extracted in step S103. Assume that all the recognition results of this character have a value of less than Th1 (S105) as a result of recognition in step S104, and that all the recognition candidate characters have almost equal likelihoods which are lower than Th2 (S108). A delimiter is output in step S107. The candidate characters in number Nmax are output from the one having a higher likelihood in step S110. A delimiter is then output in step S111.

Assume that the candidate characters output in step S110 are three candidate characters, i.e., "t", "i", and "f", and that the delimiter is, e.g., "@". In this case, the output result of processing in steps S107 to S111 is given as "@3tif@".

Recognition continues, and a character image of "e" is extracted in step S103. The first candidate character of "e" is obtained as a character having the recognition likelihood Th1 or more as a result of recognition in step S104. In this case, a recognition result of "e" is output in step S106.

A character image of "n" is extracted in step S103. The first candidate character of "n" is obtained as a character having a recognition likelihood Th1 or more as a result of recognition in step S104. In this case, a recognition result of "n" is output in step S106.

In addition, "t" is output.

The output result of the above processing is "pa@3tif@ent" and stored in the text information storage section 4-2.

The output form of the recognition result is to use a delimiter which separate character keys, and this is merely an example. Another method of discriminating the storage locations in the text information storage section in units of candidate characters obtained from one character input image to manage the storage addresses for one character input image may be employed if the method can separate character keys.

Processing for forming a search index added to image information on the basis of text information formed in OCR processing shown in the flow chart of FIG. 1 will be described in detail with reference to the flow chart in FIG. 2.

(Formation of Search Index)

Information for designating a character key type for an index is input from the keyboard 5 (S201). An index is then formed from a character corresponding to the designated character key type.

Text information stored in the text information storage section 4-2 and corresponding to the image information as an index formation target is loaded (S202).

One character corresponding to the type input in step S201 is read from the loaded text information (S204). It is determined whether the read character is a delimiter (S205). If the read character is not delimiter, this character is added to the end of the index which is being formed (S206). If the read character, however, is determined as a delimiter, candidate characters between the delimiter and the next delimiter are added to the end of the index which is being formed, thereby forming a plurality of indices (S207).

It is determined in accordance with the number of characters of the index which is being formed in step S206 or S207 whether the index is completed (S208). If YES in step S208, the completed index is stored in the search file storage section 4-3 (S209). If NO in step S208, the flow returns to step S203, and the next character is read to continuously form an index.

A parameter representing the number of characters serving as a criterion for determining in step S208 whether the index is completed is stored in the memory of the computer in advance.

When the formation of one index is completed, the flow returns to step S203. If remaining character data are present, indices are continuously formed.

In the above processing, recognition candidate characters are combined with preceding and succeeding characters from the OCR-processed text information, and character trains are developed in accordance with the designated character key types, thereby forming indices capable of minimizing search omissions.

Figure 2:
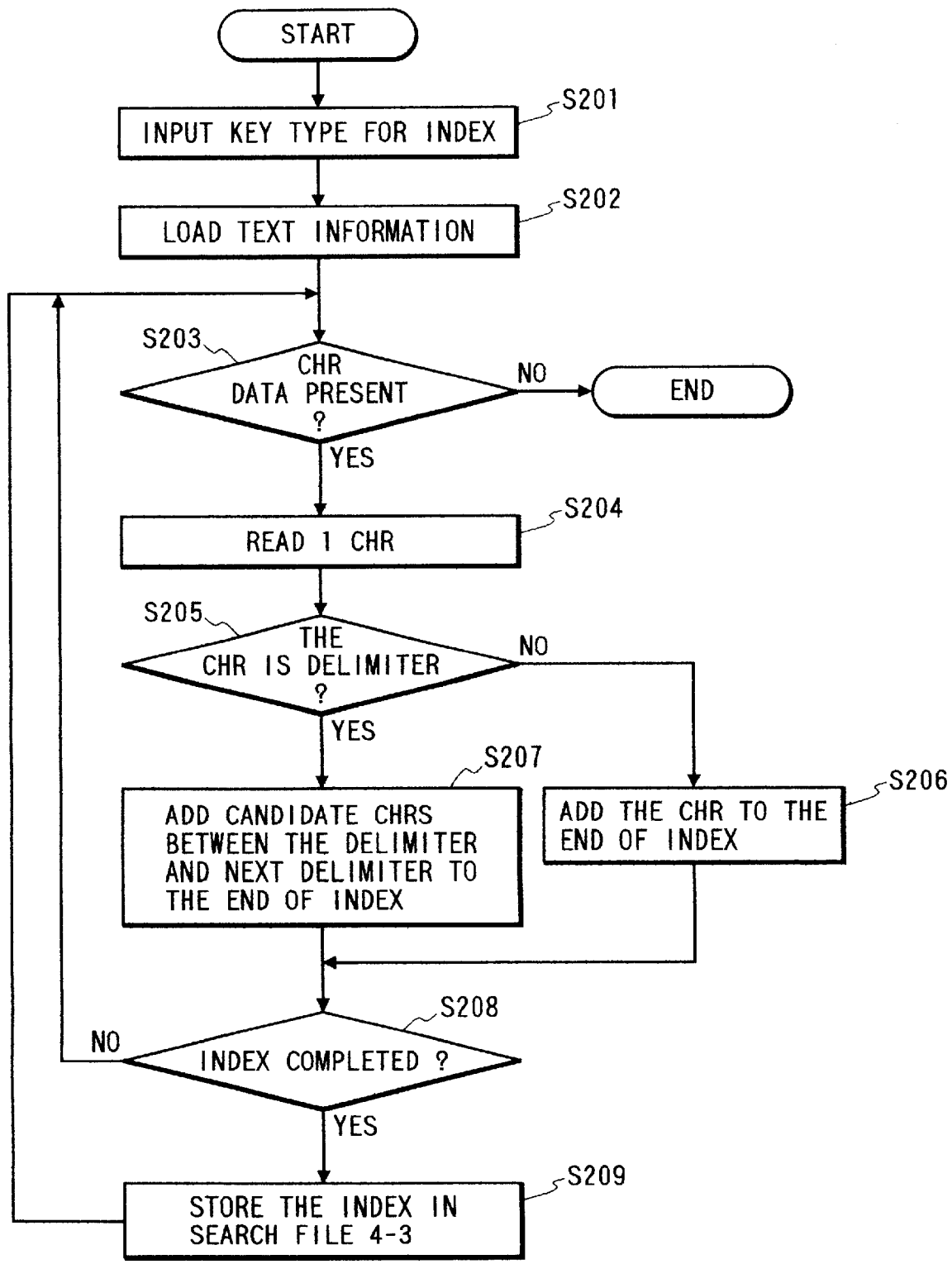
FIG. 2 is a flow chart showing processing for forming a search index added to image information.

When indices are formed from the text information of "pa@3tif@ent" described in FIG. 1 in accordance with processing of the flow chart in FIG. 1, a total of nine keys, i.e., "pa", "at", "ai", "af", "te", "ie", "fe", "en", and "nt" are formed and reflected on the indices. These keys are stored in the search file storage section 4-3.

Document search processing using a search index formed in the processing of the flow chart in FIG. 2 will be described in detail with reference to the flow chart in FIG. 3.

(Document Search Using Index)

A word to search is input from the keyboard 5, and search execution is designated (S301). It is determined in accordance with a search level or specifications set in designating search execution whether search processing with correction of a character extraction error in OCR processing is designated (S302). If NO in step S302, the word input in step S301 is divided into search keys (S303). The search keys are compared with the indices stored in the search file storage section (S304). The addresses of documents determined as matching documents in this comparison processing are output as the search result (S307).

If it is determined in step S302 that character extraction error correction is designated, characters are deleted from the word input in step S301 to form patterns, and the patterns, i.e., the rests of the word are divided into search keys (S305). These search keys are compared with the indices stored in the search file storage section (S306). Pieces of index information corresponding to the search keys for the formed patterns are extracted from the search file, and the pieces of index information corresponding to the search keys are logically ANDed in units of patterns. The logical AND results are then logically ORed for all the patterns. This character extraction error correction is performed, and even image information having a character extraction error can be searched although noise is superposed more or less.

The addresses of documents determined as matching documents in this comparison processing are output as the search result (S307).

Each search key divided in steps S303 and S305 has the same number of characters as that of an index. The search keys are divided in the same method as in index formation described in the flow chart of FIG. 2.

Document image information is read out from the image information storage section 4-1 in accordance with each document address output in step S307 and is displayed on the display device 6. In this case, if a plurality of documents are to be displayed, the list of titles of searched documents may be displayed, and an image may be displayed in accordance with a subsequent instruction for displaying image information.

A document search operation using an index upon input of a search word of "temple" from the keyboard 5 in step S301 will be described below.

The search word of "temple" input in step S301 is divided into search keys of "te", "em", "mp", "pl", and "le" in step S303. All these search keys are compared with the indices stored in the search file storage section in step S304. Documents added with all the indices of "te", "em", "mp", "pl", and "le" are searched and output in step S307.

Assume that, for example, in OCR processing executed in registration of an image, a character image extraction error occurs at a character of "m", and "m" is extracted as two patterns, a recognition result of "te@2rm@ple" is obtained from the character train of "temple", and this result is stored as text information. From this recognition result, only indices of "te", "er", "en", "rp", "np", "pl", and "le" are formed. Therefore, this document cannot be searched from the search keys of "te", "em", "mp", "pl", and "le" formed from the search word in step S303.

Search processing capable of searching the document including "temple" in an image is processing (S305 and S306) for performing character extraction error correction.

In step S305, six patterns of "emple", "tmple", "teple", "temle", and "tempe" each obtained by deleting one character from "temple" are formed, and these six patterns are divided into search keys.

Finally, the search keys are obtained from the above six patterns:

"em", "mp", "pl", "le"
"tm", "mp", "pl", "le"
"te", "ep", "pl", "le"
"te", "em", "ml", "le"
"te", "em", "mp", "pe"
"te", "em", "mp", "pl"

The resultant search keys are compared with indices stored in the search file storage section 4-3.

Figure 3:
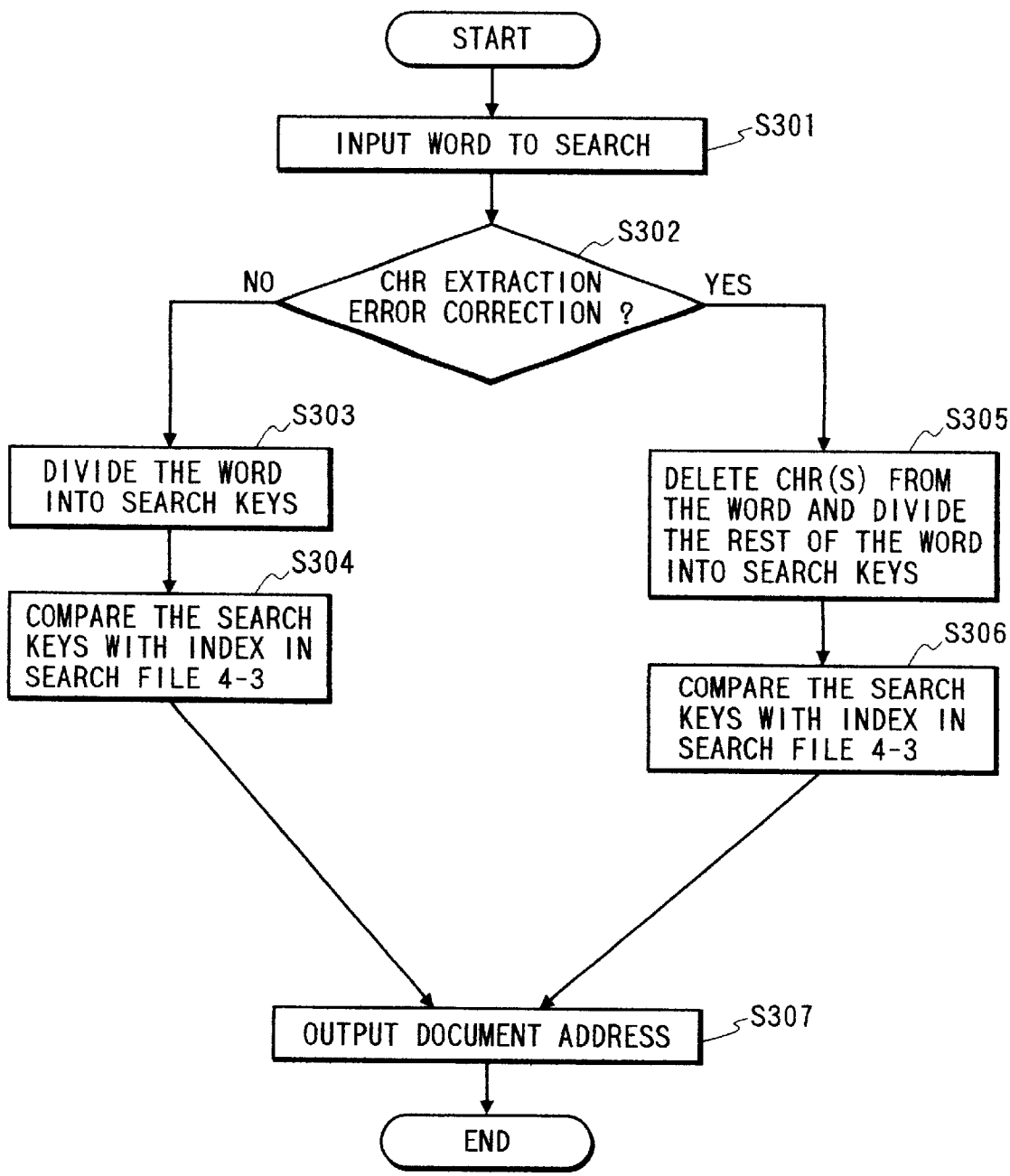
FIG. 3 is a flow chart showing processing for searching a document using a search index.
Figure 7:
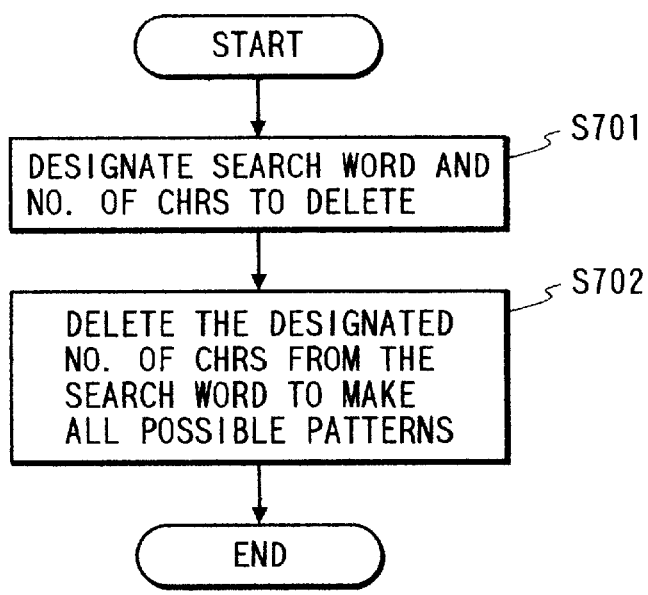
FIG. 7 is a flow chart showing first deletion processing for a character.
Figure 8:
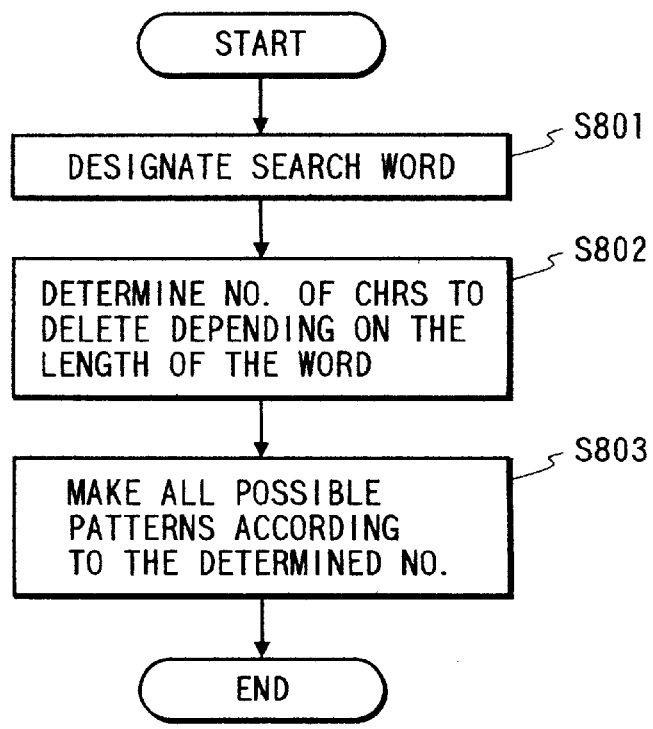
FIG. 8 is a flow chart showing second deletion processing for a character.
Figure 9:
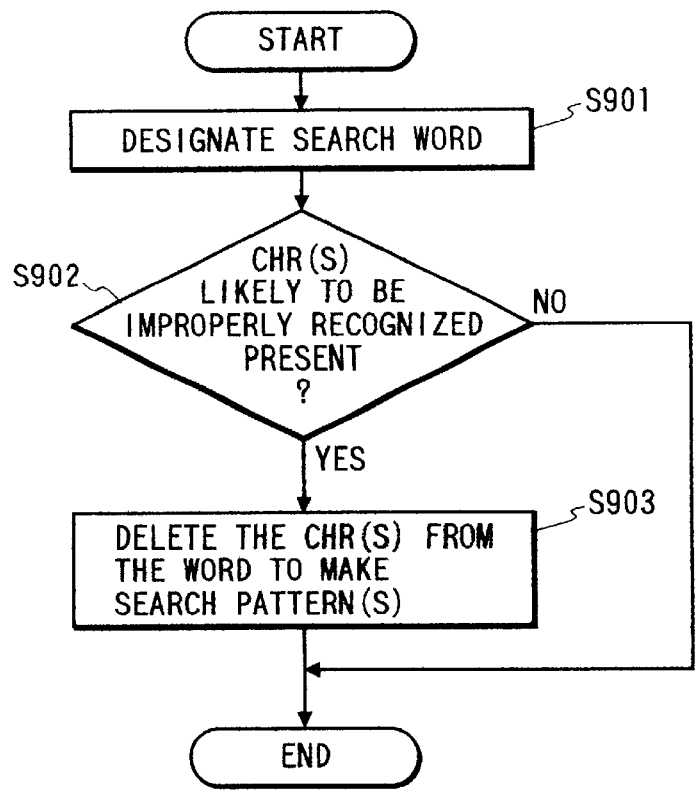
FIG. 9 is a flow chart showing third deletion processing for a character.

When a search operation in consideration of a character extraction error is designated from application software in document search processing with an index of the flow chart in FIG. 3, character deletion processing is performed in step S305 by a method shown in the flow charts in FIGS. 7 to 9. Processing shown in the flow charts of FIGS. 7 to 9 represents a deletion method in consideration of various character extraction errors, and will be described below.

In processing shown in the flow chart of FIG. 7, the number of characters to delete is designated by an operator (S701), and all possible patterns are made in accordance with the designated number of characters to delete (S702).

In processing shown in the flow chart of FIG. 8, the number of characters to delete is determined (S802) depending on the length of a search word designated in step S801, and all possible patterns are made in accordance with the determined number of characters to delete (S803). The number of characters to delete is determined by a prestored calculation formula in accordance with the number of characters of the designated search word. The calculation formula is stored in the memory of the computer 10.

In processing shown in the flow chart of FIG. 9, It is determined in steps S901 to S902) whether a search word designated in step S901 includes a character or characters likely to be improperly recognized by the OCR (S902). If YES in step S902, such a character is deleted (S903). If NO in step S902, no processing for deleting a character or characters from the search word is performed, and the character train of the designated search word is defined as a search pattern. The characters likely to be improperly recognized by the OCR are stored in the form of, e.g., a table. These characters are compared with a search word to perform determination in step S902. Since the characters to delete are limited, the number of deleted patterns can be reduced. For example, in the above detailed example, "r" in the search word of "parent" tends to generate an extraction error. When this character is registered as a candidate character likely to generate an extraction error, the search operation is limited to a pattern "paent" from which "r" is deleted. Therefore, search processing can be efficiently performed.

In processing of steps S902 and S903, a character likely to be improperly recognized by the OCR need not be deleted. To the contrary, characters likely to be properly recognized by the OCR may be stored in the form of, e.g., a table in the memory of the computer 10, and characters not included in these characters may be deleted.

In this processing, the characters likely to be improperly recognized need not be deleted. In processing shown in the flow charts of FIGS. 7 and 8, the characters likely to be improperly recognized are defined as the first priority characters of the characters to delete, thereby efficiently performing search processing.

In processing of the flow charts in FIGS. 7 to 9, a limit value for the number of patterns to be generated may be formed for an excessive number of generation patterns.

After processing shown in the flow charts of FIGS. 7 to 9, the word is divided into search keys in step S305. The search keys are compared with the search file in step S306, thereby performing search with minimum search omissions in consideration of character extraction errors.

Search processing for an entire document will be described below.

This processing can eliminate documents including search keys but not including a search word itself, as opposed to document search processing with an index of the flow chart in FIG. 3 in which a search word is divided into search keys, and the search keys are used to search documents and minimize search omissions, although documents not including the character trains of the designated search word are included in the searched documents.

To perform processing for searching an entire document, matching between a search word and the entire document is performed. In this case, processing is performed in consideration of character extraction errors in OCR processing. The details will be described with reference to the flow chart in FIGS. 5A to 5C.

This processing may be performed for all text information stored in the text information storage section 4-2, but is performed for only text information corresponding to a document limited by search processing in FIG. 3, thereby improving the processing efficiency.

(Search Processing for Entire Document)

In this processing, to consider a character extraction error in OCR processing, search processing is performed for an entire document so that a redundant character train is included in a candidate search word formed by deleting a character from a search word.

A search word and an extra number X of characters are input (S501). The search word is input by the user from the keyboard 5. The extra number X of characters is the number of characters to be added to the each search word. This value is determined by a prestored calculation formula in accordance with the number of characters of the search word. This calculation formula is stored in the memory of the computer 10. In addition, a retrieval level can be designated by the user, the determined level is reflected on the calculation for obtaining X, and search processing can be performed on the user's desired level.

When the search word and the extra number X of characters are input, it is determined in accordance with the determined level whether the level is designated with character deletion processing (S502). If YES in step S502, a character or characters are deleted from the search word input in step S501, and the position or positions of character deletion in the search word are stored (S503). The character train formed by character deletion is called a candidate search word. If NO in step S502, the search word input in step S501 serves as a candidate search word.

A comparison character train is set in the first position of the candidate search word, a comparison character is set in the first character of the comparison character train, and a counter C is set to zero. The comparison character train is defined as a search word to be compared with text information at this moment. The comparison character train sequentially updates a target in the candidate search word (S520). The comparison character is defined as a character in the comparison character train serving as a comparison target at this moment and sequentially updates a target in the comparison character train (S515). The counter C is a counter for managing an extra character train to exceed X. The counter C is incremented every time a character train is determined as an extra character train (S517).

In step S505, an entire text to be compared with a search word is loaded from the text information storage section 4-2. In step S507, one character to be compared is read from the loaded text. In step S508, it is determined whether the read character is a delimiter. If NO in step S508, the read character is compared with the comparison character (S509). However, if the character read in step S508 is determined as a delimiter, characters from this delimiter to the next delimiter are read from the text loaded in step S505. The read characters are compared with the comparison character (S510). As a result of comparison in step S509 or S510, if the two characters are identical to each other (S511), the counter C is reset to zero (S512). If the comparison character is in the last of the comparison character train (S513), a character train matching the comparison character train is determined to be present in the text loaded in step S505. A document address of this text in the image information storage section 4-1 is output (S514).

When it is determined in step S513 that the comparison character is not in the last of the comparison character train, the flow advances to step S515 to shift the comparison character to the next character. The flow then advances to processing in step S523.

If it is determined in step S511 that the two characters compared in step S509 or S510 are not identical to each other, it is determined whether the position of the comparison character is at the position of character deletion which is stored in step S503 and at the same time condition $C \leq (X-1)$ is established (S516). If the affirmative answer is obtained in step S516, the counter C is incremented (S517), and the flow advances to processing in step S523. However, if the negative answer is obtained in step S516, the comparison character is set at the head of the comparison character train, and the counter C is set to zero (C518). The flow then advances to processing in step S523.

In step S506, when no characters are left in the text loaded in step S505, it is determined whether another candidate search word is left (S519). If NO in step S510, it is determined that the document does not have any character train matching the search word, and document comparison processing is completed (S522). However, if it is determined in step S510 that another candidate search word is left, the next candidate search word is set in the comparison character train, and the counter C is set to zero (S520). In step S521, the read position of the character data is set at the head of the text information read in step S505. The flow advances to processing in step S523.

In step S523, one character is read. It is then determined in step S524 whether the read data is a blank character. If NO in step S524, the flow returns to step S506 to continue comparison. If it is determined that the data read in step S524 is a blank character, the comparison character is set at the head of the comparison character train in step S525, and the counter C is set to zero. One character is then read, and the flow returns to step S506 to continue comparison.

Figure 5B:
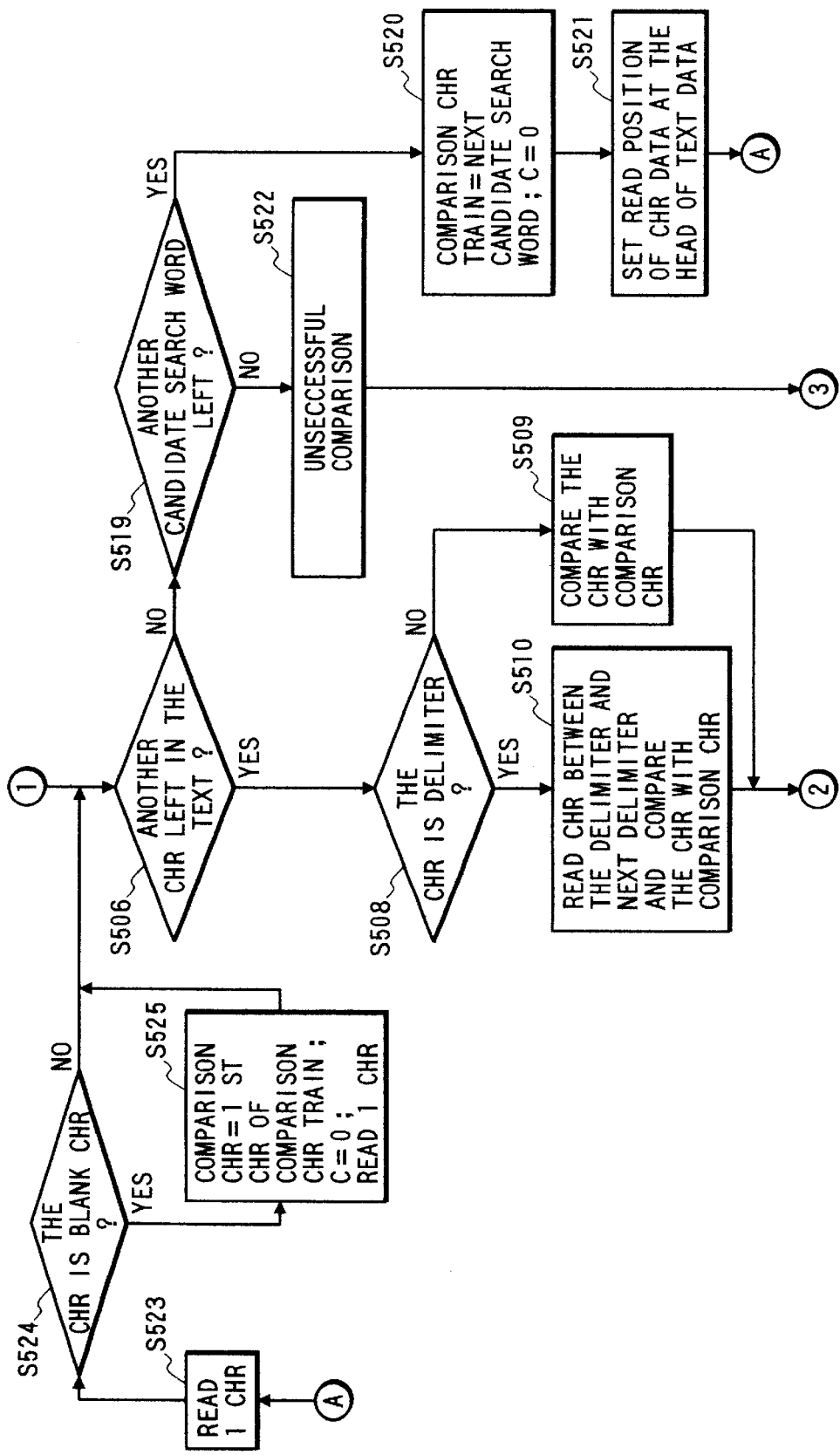
FIG. 5, which is comprised of FIGS. 5A to 5C, is a flow chart showing first search processing for an entire document.

Comparison between one text information and a search word has been described in the flow chart of FIGS. 5A to 5C. However, a plurality of pieces of text information are sequentially loaded in step S505, and processing in steps S505 to S522 is repeated. Therefore, the present invention can cope with a plurality of documents as comparison targets.

A character train supposed to match the designated search word is searched in the entire document in consideration of generation of a character extraction error in OCR processing. Even if another character train is present at the position of character deletion, matching with the search word can be determined. Like the example described above, even if a character train of "rn" erroneously recognized due to a character extraction error is present in the position of a deleted character of "m" in a pattern "teple" formed from the search word of "temple", a character train in the text of "termple" can be determined to match the search word. Therefore, the accurate search operation can be performed even if a character extraction error has occurred.

In the search processing for the entire document, as shown in the flow chart of FIGS. 5A to 5C, processing for allowing addition of a character train in a search word is performed. The position at which the character string is added is limited to the position of character deletion.

The position at which the character string is added is not limited to the position of character deletion. An entire document may be subjected to the search operation while extra characters can be added between the respective characters of the search word, thereby performing vague search processing. This processing is shown in the flow chart of FIGS. 6A to 6C.

Figure 6B:
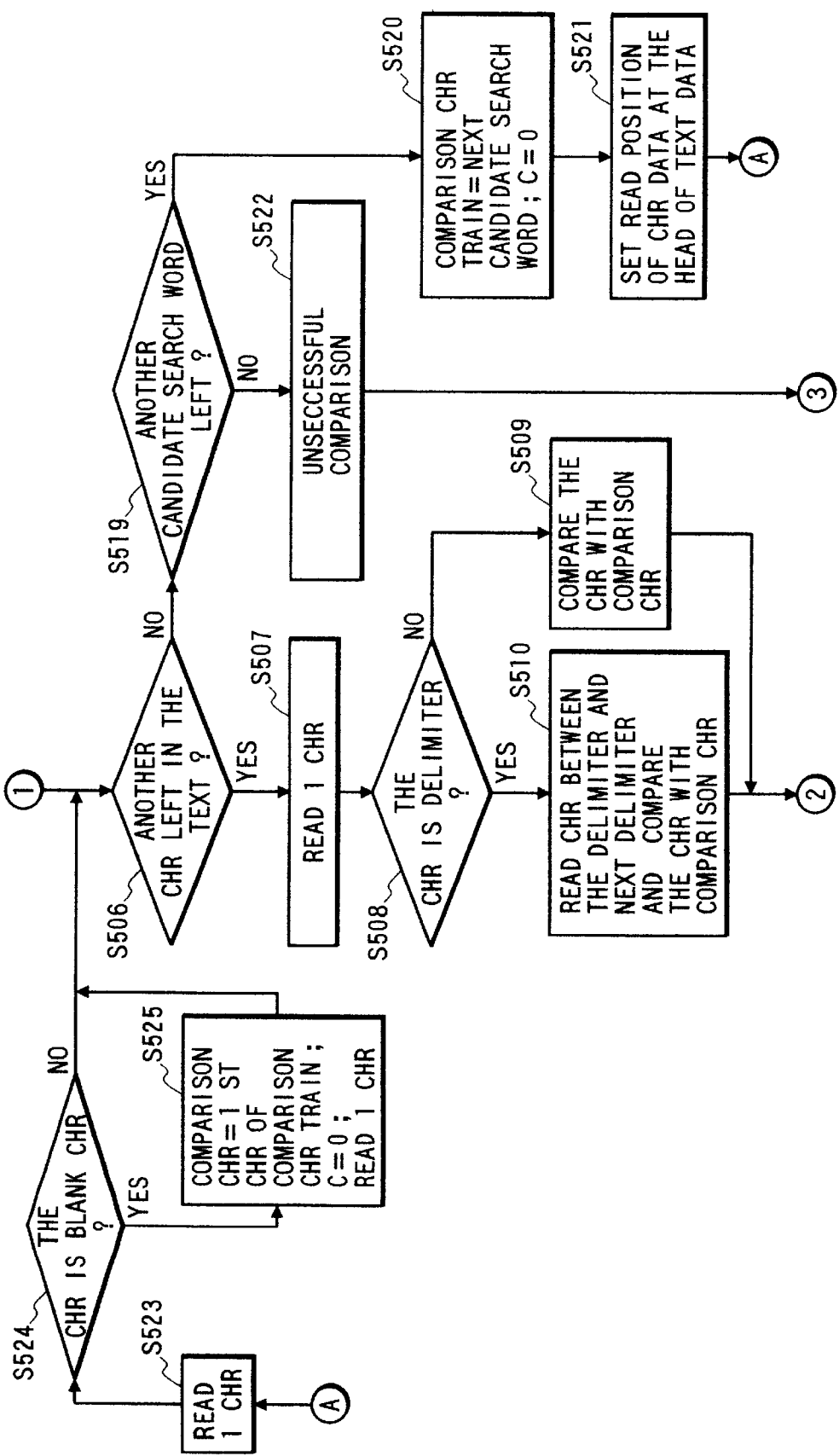
FIG. 6, which is comprised of FIGS. 6A to 6C is a flow chart showing second search processing for an entire document.

The same step symbols as in processing of the flow chart in FIGS. 5A to 5C denote the same steps in FIGS. 6A to 6C, and a detailed description thereof will be omitted.

The characteristic processing steps of FIGS. 6A to 6C are step S603 in which a position of character deletion is not stored, and step S616 in which only condition $C \leq (X-1)$ is given. Therefore, an extra character can be inserted to any position.

As described above, one designated search word is developed into a plurality of patterns, and a search operation is performed using the plurality of patterns, or a search operation is performed while an extra character is added to the position of character deletion or another position. Documents in which the desired search character train is not present may also be searched. However, this provides an important effect in search processing free from search omissions. For example, when "pray" is searched according to the method of the present invention, a document including a character train such as "play" which tends to be mixed up with "pray" can also be searched, thereby allowing vague search processing.

A Japanese user tends to mix up "r", "s", and "v" with "l", "c", and "b", respectively. Even in this case, hits can be obtained without search omissions.

In the same manner as in processing described in the above embodiments, a plurality of records may be formed, and search processing can be performed for a database with minimum search omissions.

A document keyword, a page keyword, or the like can be extracted with an OCR in this embodiment.

In the same manner as in the above technique, this embodiment can also be applied to a case wherein information obtained using an optical machine reader (OMR) or an optical bar code reader has a low recognition likelihood.

The double 2-character keys are used as the indices of a search file in this embodiment. However, an index may be formed using a word key.

In this embodiment, image information corresponding to the searched text information is output. However, in place of the image information, text information may be read out from the text information storage section 4-2 and may be output as a search result.

In this embodiment, a delimiter (@) is used as separation between character keys. If the character keys can be separated from each other, an algorithm using another character key separation means may be used without losing the effect of the present invention.

This embodiment has exemplified character keys. However, a word key may be used in place of a character key.

Figure 10:
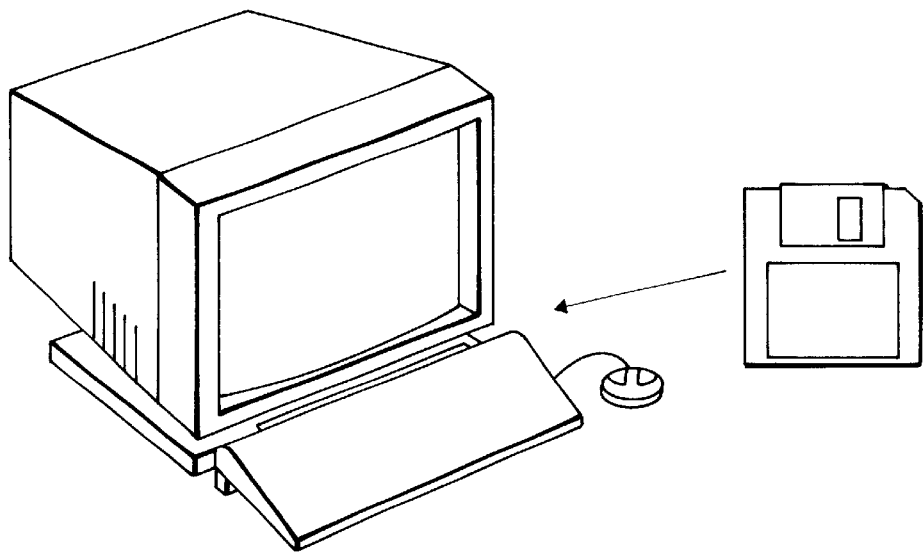
FIG. 10 is a view showing a storage medium storing a control program according to the present invention.

As described above, a storage medium (FIG. 10) in which a software program for realizing the functions of the above embodiment is stored can be supplied to a system or apparatus, and the computer (CPU or MPU) of this system or apparatus can read out the program stored in the storage medium to achieve the object of the present invention, as a matter of course.

In this case, the program codes themselves read out from the storage medium realize a new function of the present invention, and the storage medium storing the program codes constitutes the present invention.

Examples of the storage medium for supplying the program codes are a floppy disk, a hard disk, an optical disk, a magnetooptical disk, a CD-ROM, a CD-R, a magnetic tape, a nonvolatile memory card, and a ROM.

Realization of the functions of the above embodiment is not limited by execution of the program codes read out by the computer. An OS (Operating System) or the like operated on the computer executes part or all the actual processing on the basis of instructions of the program codes, and realization of the functions of the above embodiment by this processing is also incorporated in the present invention.

The program codes read out from the storage medium are written in a memory in a function expansion board inserted in the computer or a function expansion unit connected to the computer. The CPU or the like arranged on the function expansion board or unit executes part or all of the actual processing on the basis of instructions from the program codes. Realization of the functions of the above embodiment by this processing is also incorporated in the present invention.

As has been described above, according to the present invention, when a key has a low OCR recognition likelihood and is unlikely to be recognized, the number of candidates is not limited to one. By the above method, a plurality of optimal recognition candidates corresponding to recognition likelihoods are selected, and effective recognition candidate information is not discarded, but is accumulated and utilized. Therefore, effective information in character recognition will not be discarded.

As has been described above, according to the present invention, a manual correction operation can be eliminated, and a system for automatically performing operations ranging from the image input to image data/text data accumulation through OCR processing can be arranged. At the same time, a relatively inexpensive system can be realized in which a computer is not overloaded, and a decrease in processing speed can be eliminated.

As has been described above, according to the present invention, when a key has a low OCR recognition likelihood and is unlikely to be recognized, the number of candidates is not limited to one. A plurality of optimal recognition candidates corresponding to recognition likelihoods are selected, and effective recognition candidate information is not discarded, but is accumulated and utilized. Therefore, a manual correction operation can be eliminated, a computer will not be overloaded, and a processing speed can be increased.

As has been described above, according to the present invention, a character which is deleted from a designated character train is defined as a character corresponding to a predetermined character, thereby efficiently forming a pattern.

As has been described above, according to the present invention, a character which is deleted from a designated character train is defined as a character not corresponding to a predetermined character, thereby efficiently forming a pattern.

As has been described above, according to the present invention, a character which is deleted from a designated character train is determined in accordance with a prestored table, and a pattern can be efficiently formed at high speed.

What is claimed is:

1. An information processing method of determining whether a designated character train is included in text information, said method comprising the steps of:

forming a pattern including a first number of characters in which at least one character is deleted from the designated character train;

dividing the pattern into a plurality of test character trains each including a predetermined second number of characters of the pattern without any other characters, the second number being less than the first number;

performing a first determination that determines whether the test character trains are included in the text information;

performing a second determination that determines whether the first number of characters are included in the text information for which the first determination has determined that the test character trains are included; and controlling output of the text information, for which the second determination has determined that the first number of characters are included, as a search operation result.

2. A method according to claim 1, wherein said forming step comprises forming a plurality of types of patterns such that, for each of the plurality of types of patterns, one character is deleted from the designated character train, and said step of performing the first determination comprises performing a determination using the plurality of types of patterns.

3. A method according to claim 1, wherein the character deleted from the designated character train is defined as a character corresponding to a predetermined character.

4. A method according to claim 1, wherein the character deleted from the designated character train is defined as a character not corresponding to a predetermined character.

5. A method according to claim 1, wherein the character deleted from the designated character train is determined by a prestored table.

6. A method according to claim 1, wherein the text information is a result of character recognition of input image information.

7. A method according to claim 1, wherein the second determination step allows an addition of arbitrary characters numbering less than a predetermined number at a position where the at least one character was deleted from.

8. A method according to claim 1, wherein the first determination is executed by determining whether each character of each test character train is identical to that of the text information.

9. A method according to claim 1, further comprising the step of outputting text information determined to include the designated character train.

10. A method according to claim 6, further comprising the step of outputting image information corresponding to text information determined to include the designated character train.

11. A method according to claim 1, wherein the second determination step allows an addition of arbitrary characters numbering less than a predetermined number at any position without reference to a position where the at least one character was deleted from.

12. A computer-readable storage medium storing a control program for performing a determination to determine whether a designated character train is included in text information, said program comprising:

program code for a formation step of forming a pattern including a first number of characters in which at least one character is deleted from the designated character train;

program code for a division step of dividing the pattern into a plurality of test character trains each including a predetermined second number of characters of the pattern without any other characters, the second number being less than the first number;

program code for a first determination step of performing a first determination that determines whether the test character trains are included in the text information;

program code for a second determination step of performing a second determination that determines whether the first number of characters are included in the text information for which the first determination step has determined that the test character trains are included; and program code for a control step of controlling output of the text information, for which the second determination step has determined that the first number of characters are included, as a search operation result.

13. A medium according to claim 12, wherein the character deleted from the designated character train is defined as a character corresponding to a predetermined character.

14. A medium according to claim 12, wherein the character deleted from the designated character train is defined as a character not corresponding to a predetermined character.

15. A medium according to claim 12, wherein the character deleted from the designated character train is determined by a prestored table.

16. An information processing method of determining whether a designated character train is included in text information, said method comprising the steps of:

forming a pattern including a first number of characters in which at least one character is deleted from the designated character train;

dividing the pattern into a plurality of test character trains each including a predetermined second number of characters of the pattern without any other characters, the second number being less than the first number;

performing a first determination that determines whether the test character trains are included in the text information under an assumption that another character is inserted at a position of character deletion in the formed pattern;

performing a second determination that determines whether the first number of characters are included in the text information for which the first determination has determined that the test character trains are included; and controlling output of the text information, for which the second determination has determined that the first number of characters are included, as a search operation result.

17. A method according to claim 16, wherein the text information is a result of character recognition of input image information.

18. A method according to claim 16, wherein the character deleted from the designated character train is defined as a character corresponding to a predetermined character.

19. A method according to claim 16, wherein the character deleted from the designated character train is defined as a character not corresponding to a predetermined character.

20. A method according to claim 16, wherein the character deleted from the designated character train is determined by a prestored table.

21. A method according to claim 16, wherein said step of performing the first determination comprises determining whether each character of the formed pattern is identical to that of the text information.

22. A method according to claim 16, further comprising the step of outputting text information determined to include the designated character train.

23. A method according to claim 17, further comprising the step of outputting image information corresponding to text information determined to include the designated character train.

24. An information processing apparatus comprising:

a text information storage memory for storing text information;

a first determination unit for determining whether a designated character train is included in the text information, wherein said first determination unit determines whether the test character trains are included in the text information;

a pattern forming unit for forming a pattern including a first number of characters in which at least one character is deleted from the designated character train;

a second determination unit for determining whether the first number of characters is included in the text information for which said first determining unit has determined to include the test character trains; and a controller for outputting the text information, for which said second determination unit has determined to include the first numbers of characters, as a search operation result.

25. An apparatus according to claim 24, wherein
   said pattern forming unit forms a plurality of types of patterns such that, for each of the plurality of types of patterns, one character is deleted from the designated character train, and
   said first determination unit performs a determination using the plurality of types of patterns.

26. An apparatus according to claim 24, wherein the character deleted from the designated character train by said pattern forming unit is defined as a character corresponding to a predetermined character.

27. An apparatus according to claim 24, wherein the character deleted from the designated character train by said pattern forming unit is defined as a character not corresponding to a predetermined character.

28. An apparatus according to claim 24, wherein the character deleted from the designated character train by said pattern forming unit is determined by a prestored table.

29. An apparatus according to claim 24, wherein the text information is a result of character recognition of input image information.

30. An apparatus according to claim 24, further comprising a pattern divider for dividing the pattern into character trains each including a predetermined number of characters, wherein said first determination unit performs a determination in accordance with whether the divided character trains are included in the text information.

31. An apparatus according to claim 24, wherein said first determination unit determines whether each character of the character train is identical to that of the text information.

32. An apparatus according to claim 24, further comprising a text information output unit for outputting text information determined by said first determination unit to include the designated character train.

33. An apparatus according to claim 29, further comprising an image information output unit for outputting image information corresponding to text information determined by said first determination unit to include the designated character train.

34. An apparatus according to claim 24, wherein said second determination unit allows an addition of arbitrary characters numbering less than a predetermined number at a position where the at least one character was deleted from.

35. An apparatus according to claim 24, wherein said second determination unit allows an addition of arbitrary characters numbering less than a predetermined number at any position without reference to where the at least one character was deleted from.

36. A medium according to claim 12, wherein the text information is a result of character recognition of input image information.

37. A medium according to claim 12, wherein the first determination step is executed by determining whether each character of each test character train is identical to that of the text information.

38. A medium according to claim 12, wherein the program further comprises program code for an output step of outputting text information determined to include the designated character train.

* * * * *

UNITED STATES PATENT AND TRADEMARK OFFICE
CERTIFICATE OF CORRECTION

PATENT NO. : 6,310,971 B1
DATED : October 30, 2001
INVENTOR(S) : Hirotaka Shiiyama It is certified that error appears in the above-identified patent and that said Letters Patent is hereby corrected as shown below:

<u>Title page, Item [54], and Column 1, line 3,</u>
Title, "STORING MEDIUM" should be deleted.
Item [56], References Cited,
FOREIGN PATENT DOCUMENTS, insert -- 0424803 05/02/91 EPO. --; and insert -- 0518496 12/16/92 EPO. --.
OTHER PUBLICATIONS, insert -- Chang, et al. "Approximate String Matching in Sublinear Expected Time", Proc. Ann. Symp. Foundations of Comp. Sci.", 10/22/90, vol. 1, IEEE, pp. 116-124 --; insert -- Takahashi et al., "A spelling correction method and its application to an OCR system", Pattern Recognition, vol. 23, no. 3/04, 01/01/90, pp. 363-377 --; and insert -- Wu, et al., "Fast Text Searching Allowing Errors", Comm. Assoc. Computing Machinery, vol. 35, no. 10, 10/01/92, pp. 83-91. --.

<u>Column 1,</u>
Line 53, "of" should read -- of: --.

<u>Column 7,</u>
Line 30, "It" should read -- it --.
Line 31, "S902)" should read -- S902 --.

<u>Column 8,</u>
Line 33, "the each" should read -- each --.
Line 54, "zero." should read -- zero (S504). --.

<u>Column 9,</u>
Line 35, "S510," should read -- S519, --.
Line 39, "S510" should read -- S519 --.

UNITED STATES PATENT AND TRADEMARK OFFICE
CERTIFICATE OF CORRECTION

PATENT NO. : 6,310,971 B1
DATED : October 30, 2001
INVENTOR(S) : Hirotaka Shiiyama It is certified that error appears in the above-identified patent and that said Letters Patent is hereby corrected as shown below:

Column 14,
Line 35, "numbers" should read -- number --.

Signed and Sealed this

Eighteenth Day of June, 2002

*Attest:*

*Attesting Officer*

JAMES E. ROGAN
*Director of the United States Patent and Trademark Office*